United States Patent
Cho et al.

(10) Patent No.: US 8,611,266 B2
(45) Date of Patent: Dec. 17, 2013

(54) APPARATUS AND METHOD OF POWER SAVING FOR STATIONS IN WIRELESS COMMUNICATION SYSTEM

(75) Inventors: Seungkwon Cho, Guri-si (KR); Jaewoo Park, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 217 days.

(21) Appl. No.: 12/969,708

(22) Filed: Dec. 16, 2010

(65) Prior Publication Data
US 2011/0149855 A1 Jun. 23, 2011

(30) Foreign Application Priority Data
Dec. 17, 2009 (KR) .................. 10-2009-0126048

(51) Int. Cl.
*G08C 17/00* (2006.01)
(52) U.S. Cl.
USPC ...... 370/311; 370/352; 455/343.2; 455/343.4
(58) Field of Classification Search
USPC ......... 370/353–356, 358, 389, 466, 468, 470, 370/472, 338, 467, 311; 455/343.2, 343.4
See application file for complete search history.

(56) References Cited

U.S. PATENT DOCUMENTS

| 2004/0165574 A1* | 8/2004 | Kakumaru et al. ........... 370/349 |
| 2004/0184475 A1* | 9/2004 | Meier ......................... 370/449 |
| 2007/0238439 A1 | 10/2007 | Alon et al. |

FOREIGN PATENT DOCUMENTS

KR 10-2009-0055746 A 6/2009

* cited by examiner

*Primary Examiner* — Huy D. Vu
*Assistant Examiner* — Dady Chery
(74) *Attorney, Agent, or Firm* — Kile Park Reed & Houtteman PLLC

(57) ABSTRACT

A power control apparatus of a wireless communication terminal providing a voice over internet protocol (VoIP) service in a wireless communication system includes a user interface unit configured to include a voice CODEC using in the VoIP service, a controller configured to be connected to the user interface unit, include predetermined application programs including a VoIP application program, and control signaling for setting up a VoIP call and canceling a VoIP call, and a medium access control (MAC) processor configured to perform a medium access control function and include a timer unit for beginning a unscheduled-service period (U-SP) by receiving a VoIP call setup signal and a VoIP call cancel signal from the controller.

14 Claims, 3 Drawing Sheets

APPARATUS AND METHOD OF POWER SAVING FOR STATIONS IN WIRELESS COMMUNICATION SYSTEM

CROSS-REFERENCE TO RELATED APPLICATIONS

The present application claims priority of Korean Patent Application No. 10-2009-0126048, filed on Dec. 17, 2009, which is incorporated herein by reference in its entirety.

BACKGROUND OF THE INVENTION

1. Field of the Invention

Exemplary embodiments of the present invention relate to an apparatus and method for power saving for a station; and, more particularly, to an apparatus and method for power saving for a station in a wireless communication system.

2. Description of Related Art

There are various standards introduced in a wireless communication market. A wireless communication network is classified into a wireless local area network (WLAN), a wireless personal area network (WPAN), and a wireless broadband access network according to a scope covered by one technology. Among them, a WLAN is one of most commercialized wireless communication technologies that support a short distance communication. In an early stage, a WLAN initially employed International standards IEEE 802.11b. In order to increase a data processing rate, the International standards IEEE 802.11b has been advanced to IEEE 802.11ac and IEEE 802.11ad through IEEE 802.11n. Lately, a WLAN employs IEEE 802.11ac and IEEE 802.11ad.

Due to the advance of a wireless communication technology, a wireless terminal supporting mobility has been introduced. One of major problems of a wireless terminal supporting mobility is a power problem. That is, a wireless terminal cannot continuously and stably receive power. A wireless terminal receiving a WLAN service has the same problem. In order to overcome the power problem, a wireless access network employing IEEE 802.11 provides various methods for saving power of wireless terminal. Particularly, such a power saving method is very important in a wireless communication service such as a Voice Over Internal Protocol (VoIP) service. In the VoIP service, users speak only 40% of a total talk time. That is, the users do not speak about 60% of the talk time. Accordingly, it is possible to save power using 60% of the talk time that the users do not speak. As a power saving method, a power save poll (PS-Poll) legacy power saving method was introduced in IEEE 802.11 and an unscheduled automatic power saving delivery (U-APSD) method was introduced in IEEE 802.11e. Many researches have proved that the U-APSD method is more suitable to a wireless communication than the PS-poll Legacy power saving method.

The PS-Poll based legacy power saving method and the trigger based U-APSD method have advantages and disadvantages as follows.

At first, the PS-Poll based legacy power saving method and the trigger based U-APSD method will be compared in a view of a frame collision rate of a terminal when an access point (AP) transmits buffered MSDUs through a downlink to a terminal. Here, MSDU stands for medium access control service data unit.

In the PS-Poll based legacy power saving method, all terminals transmit data after a beacon message including a traffic indication message (TIM). In trigger based U-APSD method, data is transmitted at a random moment. Therefore, the PS-Poll based legacy power saving method has a higher frame collision rate than that of the trigger based U-APSD method. A high frame collision rate means that a terminal is required to stay an awake state further longer during a back-off period. Accordingly, the PS-Poll based legacy power saving mode has low power saving effect in comparison with the trigger based U-APSD method in view of the frame collision rate.

Secondly, the PS-Poll based legacy power saving method is compared with the trigger based U-APSD method in a view of an additional signaling overhead which is caused signals generated by a terminal to receive MSDUs buffered in an access point (AP). In the PS-Poll based legacy power saving method, one PS-Poll is used to receive one buffered data. Accordingly, the PS-Poll based legacy power saving method has high signaling overhead. In the trigger based U-APSD method, a plurality of buffered MSDUs are received per one trigger frame according to a maximum service period (MAX SP) which is set up in a QoS information field. Accordingly, the trigger based U-APSD method has low signaling overhead in comparison with the PS-Poll based power saving method. High signaling overhead means that a terminal has to transmit more additional signals to transmit to an access point. Accordingly, a terminal has to stay in an awake state longer in the PS-Poll based legacy power saving method in comparison with the trigger based U-APSD method. Therefore, the PS-Poll based legacy power saving mode has worse power saving effect in comparison with the trigger based U-APSD method in a view of the signaling overhead.

Thirdly, the PS-Poll based legacy power saving method is compared with the trigger based U-APSD method in a view of a method of determining whether frames are buffered in an access point for downlink transmission. In the PS-Poll based legacy power saving method, a terminal determines whether or not a frame is buffered in an access point for downlink transmission by receiving and analyzing a traffic indication message (TIM) included in a beacon signal. In the trigger based U-APSD method, a terminal is required to additionally transmit a trigger frame for determining whether a frame is buffered in an access point for downlink transmission. Accordingly, the PS-Poll based legacy power saving method has better power saving effect in a view of the method of determining whether a frame is buffered in an AP for downlink transmission because the PS-Poll based legacy power saving mode is not required to transmit additional signal to determine the buffered frame in an access point.

As described above, the PS-Poll based legacy power saving method has better power saving effect in a view of the method for determining buffered downlink frames in an access point. However, the trigger based U-APSD method has better power saving effect in views of the frame collision rate and signaling overhead. Accordingly, it is necessary to develop a power saving method suitable in overall condition of a wireless communication environment.

SUMMARY OF THE INVENTION

An embodiment of the present invention is directed to a power saving apparatus and method for maximally reducing power consumption of a wireless communication terminal.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a power control apparatus of a wireless communication terminal providing a voice over internet protocol (VoIP) service in a wireless communication system includes a user interface unit configured to include a voice CODEC using in the VoIP service, a controller configured to be connected to the user interface unit, include predetermined application programs including a VoIP application program, and control signaling for setting up a VoIP call and canceling a VoIP call, and a medium access control (MAC) processor configured to perform a medium access control function and include a timer unit for beginning a unscheduled-service period (U-SP) by receiving a VoIP call setup signal and a VoIP call cancel signal from the controller.

In accordance with another embodiment of the present invention, a method for controlling power of a wireless communication terminal supporting a voice over internet protocol (VoIP) service using an unscheduled automatic power saving delivery (U-APSD) method after setting up four access categories as a delivery-enabled state in a wireless communication system, the method includes initializing a timer when a VoIP call is setup for starting the VoIP service, determining whether the VoIP call is terminated or not when a frame of an access category setup as a trigger-enabled state is not transmitted to an access point, transmitting a trigger frame to the access point when it is determined that the VoIP call is not terminated and when a current timer value exceeds a predetermined timer maximum value, and receiving buffered data from the access point that receives the trigger frame.

DESCRIPTION OF SPECIFIC EMBODIMENTS

Figure 1:
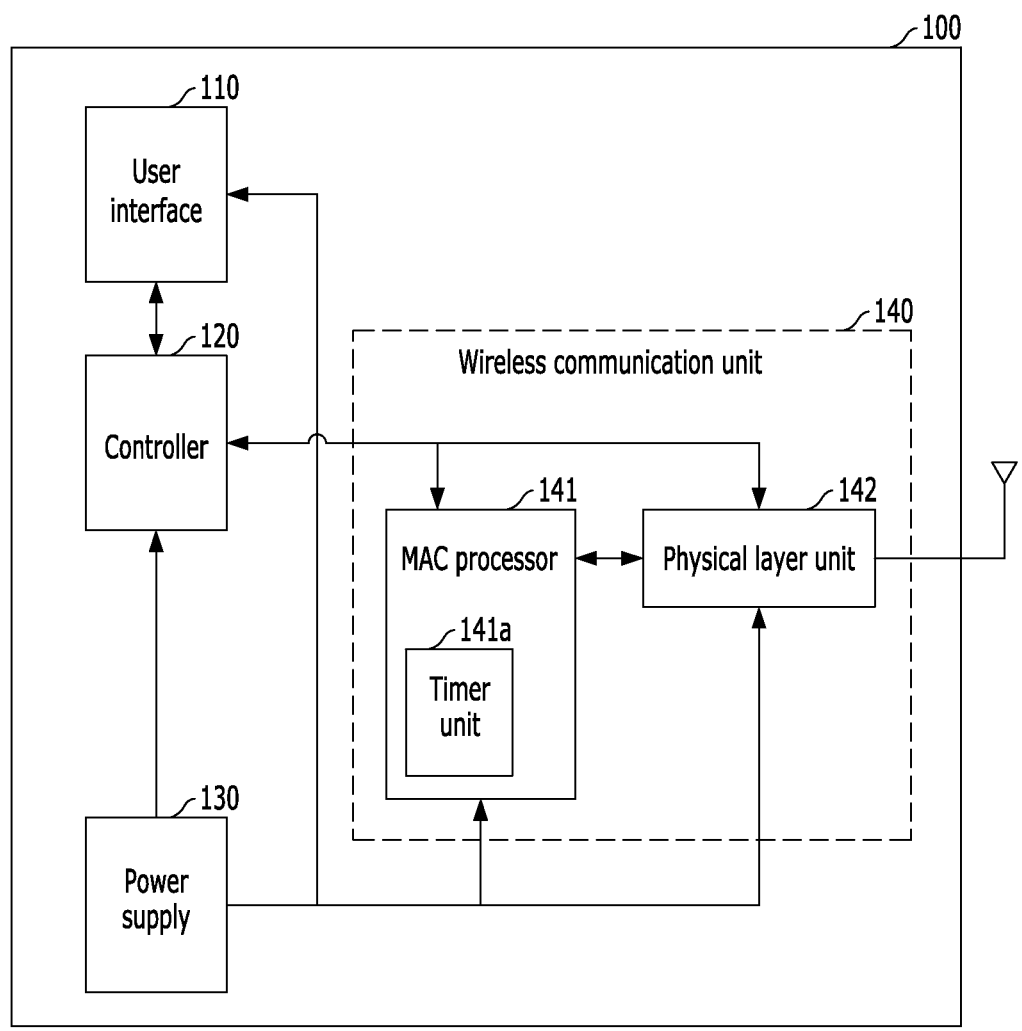
FIG. 1 is a block diagram illustrating a wireless communication terminal in accordance with an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a block diagram illustrating a wireless communication terminal 100 in accordance with an embodiment of the present invention.

Referring to FIG. 1, the wireless communication terminal 100 includes a user interface unit 110, a controller 120, a power supply 130, and a wireless communication unit 140. The wireless communication unit 140 includes a medium access control (MAC) processor 141 and a physical layer unit 142. The MAC processor 141 includes a timer unit 141a.

Hereinafter, a power saving operation of a wireless communication terminal 100 will be described with reference to FIG. 1. The user interface unit 110 is connected to the controller 120. The user interface unit 110 includes a LCD display, a key pad, a microphone, and a speaker for receiving information from a user or providing information to a user. For instance, in case of a VoIP service, the user interface unit 110 includes a voice CODEC for encoding voice to a digital signal and decoding a digital signal to voice. The controller 120 includes various application programs such as a VoIP application program to provide related services to a user through the user interface unit 110. Further, the controller 120 transmits data of a user application program to an access point (AP) through the wireless communication unit 140 or receives data from the AP through the wireless communication unit 140. In case of the VoIP service, the controller 120 controls a signaling process for setting up a VoIP call and terminating a VoIP call. The power supply 130 is a unit supplying power such as a battery. The power supply 130 provides power to all constituent elements of the wireless communication terminal 100.

The wireless communication unit 140 modulates data from the controller 120 to a radio frequency (RF) signal and transfers the RF signal to the AP. Further, the wireless communication unit 140 receives a RF signal from the AP, demodulates the received RF signal to data, and transfers the data to the controller 120. The MAC processor 141 of the wireless communication unit 140 exchanges user data and control data with the controller 120 and performs a MAC layer function such as a system accessing process, a bandwidth allocation request process, a call setup process, and a call management process based on the exchanged data. Particularly, the MAC processor 141 includes the timer unit 141a that controls transmissions of trigger frames for beginning an unscheduled-service period (U-SP) once it receives requests for setting up a VoIP call and for cancelling a VoIP call from the controller 120.

The wireless communication unit 140 further includes the physical layer unit 142. The physical layer unit 142 encodes and modulates data from the MAC processor 141 to a RF signal to be suitable to a corresponding wireless channel environment and transmits the RF signal to an access point. The physical layer unit 142 also receives a RF signal from the access point, demodulates and decodes the RF signal to data, and transfers the data to the MAC processor 141. Hereinafter, a power saving method of the wireless communication terminal 100 in accordance with an embodiment of the present invention will be described with reference to FIGS. 2 and 3.

The power saving method in accordance with an embodiment of the present invention will be described under an assumption that a wireless communication terminal includes a VoIP function. Further, a power saving method in accordance with an embodiment will be described by dividing it into a power saving method before VoIP call setup and a power saving method after VoIP call setup.

Figure 2:
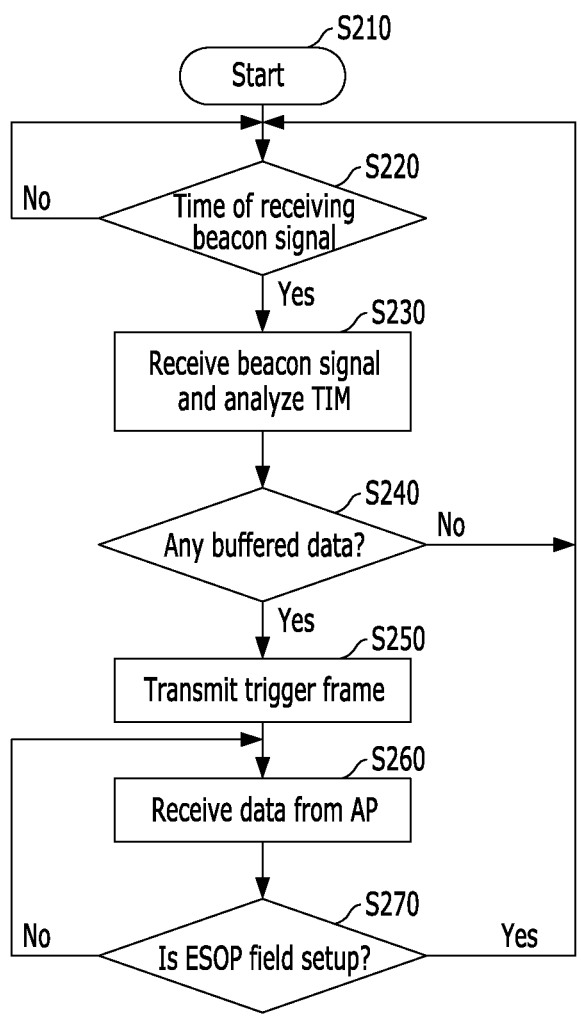
FIG. 2 is a flowchart illustrating a power saving method before VoIP call setup in accordance with an embodiment.

FIG. 2 is a flowchart illustrating a power saving method before VoIP call setup in accordance with an embodiment. That is, FIG. 2 illustrating a power saving method when a VoIP function is not performed.

The controller 120 transmits a signal for setting up a VoIP call and for canceling a VoIP call in order to provide a VoIP service. The MAC processor 141 determines whether a VoIP service is used or not based on such signaling information received from the controller 120. When the VoIP service is not used, a U-APSD method is performed based on a power saving method in accordance with an embodiment of the present invention, which is shown in FIG. 2. The U-APSD method is a power saving method introduced in IEEE 802.11e to provide QoS to a user. In IEEE 802.11e, eight priorities are assigned according to a QoS level of a packet. A packet is managed based on four access categories (AC) according to the assigned priorities.

At step S210, a wireless communication terminal always sustains four access categories as a delivery-enabled state when the VoIP service is not used. That is, an access point sets up four access categories as the delivery-enabled state. For example, in any one of four access categories, the access point sets an association ID (AID) bit of the wireless communication terminal included in a TIM of a beacon message when the access point has buffered data to be transmitted to the wireless communication terminal through a downlink and transmits the beacon to the wireless communication terminal at the step S210 with the corresponding AID bit set. At step S220, the wireless communication terminal determines whether it is a time to receive a beacon message or not based on the received beacon message. If it is not a time for receiving a beacon message, the wireless communication terminal continuously monitors whether it is a time to receive the beacon message or not while staying in a doze state. At step S230, the wireless communication terminal transits a current state to an awake state at a time of receiving a beacon message, receives the beacon message, and analyzes a TIM included in the received beacon message. At step S240, the wireless communication terminal determines whether data is buffered in the AP or not based on the AID bit of the beacon message. When it is determined that the access point does not have buffered data, the step S220 is performed again for transiting a current state to the doze state and continuously monitoring whether it is a time for receiving a beacon message or not. At step S250, the wireless communication terminal transits a current state to the awake state and transmits a trigger frame when the access point includes buffered data. When the wireless communication terminal transmits the trigger frame at the step S250, the U-SP begins and the wireless communication terminal controls the access point to transmit the buffered data to the wireless communication terminal from the access point. As described above, the wireless communication terminal transmits the trigger frame according to the analysis result of the TIM in the beacon message which is regularly transmitted although the wireless communication terminal operates in the U-APSD method. At step S260, the wireless communication terminal receives the buffered data from the access point. At step S270, the wireless communication terminal continuously determines whether an End of Service Period (EOSP) bit is setup in a frame header of a frame from the AP or not. When it is determined that the EOSP bit is not setup at the step S270, the wireless communication terminal continuously sustains the awake state and receives the data from the AP. When it is determined that the EOSP bit is setup at the step S270, the wireless communication terminal transits the awake state to the doze state at the step S220 and continuously monitors whether it is a time to receive a beacon message while sustaining the doze state.

As described above, the power saving method in accordance with an embodiment of the present invention sets up all access categories as the delivery-enabled state in data transmission before setting up a VoIP call although the IEEE 802.11e U-APSD method is used. That is, the power saving method in accordance with an embodiment of the present invention determines whether the access point includes buffered frames to be transmitted through a downlink simply based on a beacon message without transmitting an additional trigger frame. Therefore, the power saving method in accordance with the present invention accepts the advantage of the PS-Poll based legacy power saving method. Further, the power saving method in accordance with an embodiment of the present invention also accepts the advantage of the trigger based U-APSD method by continuously receiving data buffered in the access point using the U-SP initiated by the trigger frame.

Figure 3:
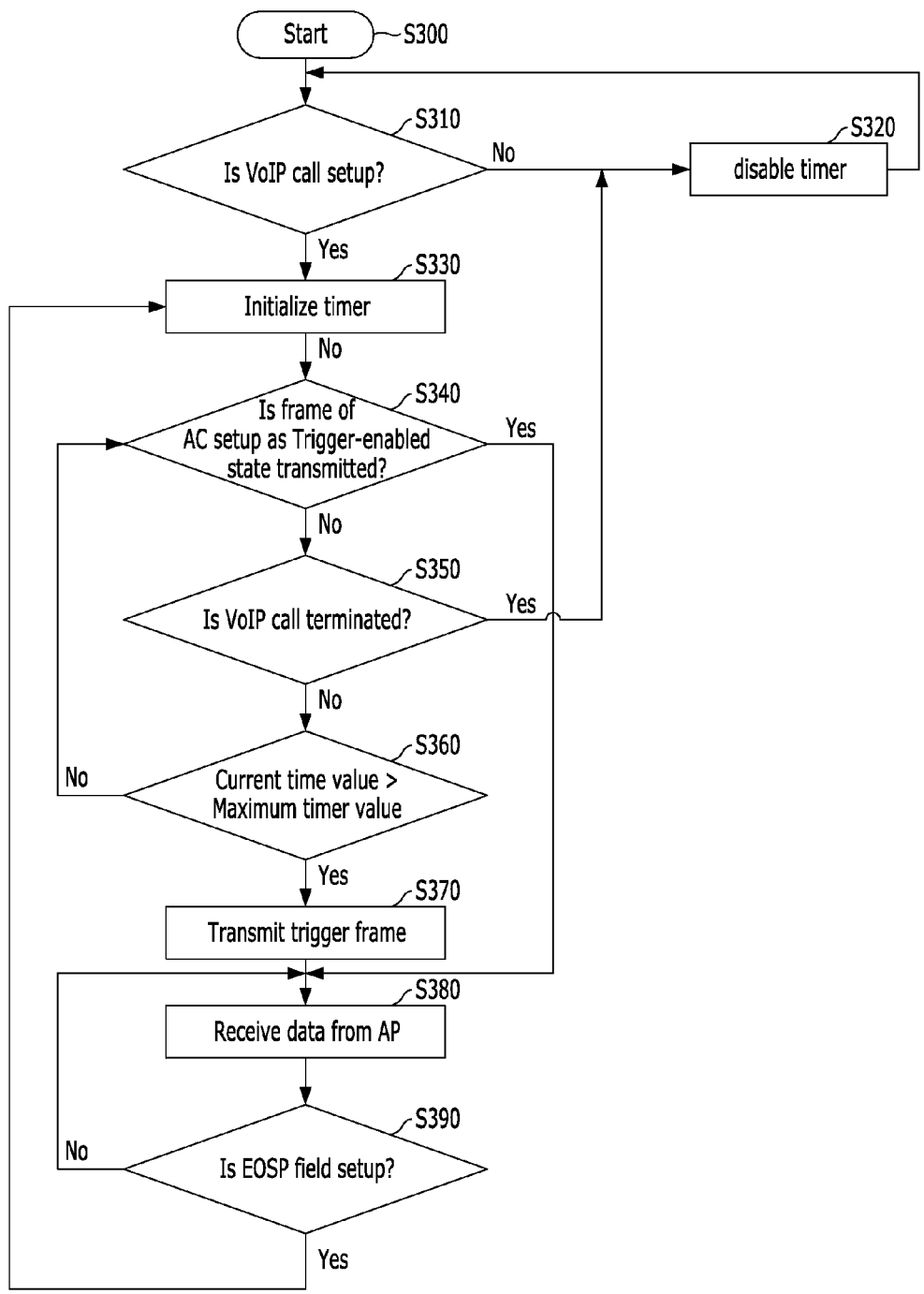
FIG. 3 is a flowchart illustrating an operation of a timer required in a U-APSD power saving operation after setting up a VoIP call in accordance with an embodiment of the present invention.

FIG. 3 is a flowchart illustrating an operation of a timer required in a U-APSD power saving operation after setting up a VoIP call in accordance with an embodiment of the present invention.

A session initiation protocol (SIP) or H.323 used for a VoIP service defines a call initiation method, a call modification method, and a call termination method in order to support a voice packet. The controller 120 in accordance with an embodiment of the present invention transmits signals for setting up a VoIP call setup and for cancelling a VoIP call to the MAC processor 114. The MAC processor 141 performs a U-APSD method by controlling a timer based on a power saving method in accordance with an embodiment of the present invention, which is shown in FIG. 3, after setting up a VoIP call.

At step S300, the wireless communication terminal sustains four access categories as a delivery-enabled state. At step S310, the MAC processor 141 of the wireless communication terminal determines whether a VoIP call is setup or not based on signals for VoIP call setup and VoIP call cancel, which are transferred from the controller 120. At step S320, a timer of a timer unit 141a does not operate when a VoIP is not setup. The timer unit 141a is included in the MAC processor 141 of the wireless communication terminal.

At step S330, the MAC processor 141 initiates the timer of timer unit 141a when a VoIP call is setup in response to the controller 120. Here, an initial value of the timer is setup using a voice CODEC packet generation cycle of the user interface unit 110, which is received through the controller 120 when the timer is initialized.

In an embodiment of the present invention, an access category of transmitting an uplink VoIP packet generated in voice CODEC is setup as a trigger-enabled state. Since a voice signal is bi-directional, a U-SP used for transmission of downlink VoIP packets buffered in an AP is triggered by an uplink VoIP packet transmitted by a terminal. After triggering, the access point transmits the buffered downlink VoIP packet to the wireless communication terminal. The wireless communication terminal can automatically and regularly receive downlink data at a predetermined interval if the uplink VoIP packet is set up as a trigger-enabled access category using the property of the uplink VoIP packet generated at a predetermined interval. That is, the access point can transmit the buffered data without additionally transmitting a trigger frame by wireless communication terminal.

At step S340, the wireless communication terminal continuously determines whether a frame of the trigger-enabled access category is transmitted to the access point. When the U-SP begins by transmitting the frame of the triggered-enabled access category, the wireless communication terminal receives data transmitted from the access point at step S380. At step S380, the access point transmits a frame having data with a corresponding access category received from the wireless communication terminal when the access point includes buffered data. When the access point does not have buffered data, the access point transmits a QoS Null frame with an ESOP field setup.

At step S390, the wireless communication terminal determines whether a header of received data from the access point has an ESOP field set to 1 or not in regardless of whether the access point includes buffered data or not. If the EOSP field is not set to 1, the wireless communication terminal continuously receives data from the access point at the step S380 because the U-SP is not over. If the EOSP field is setup, it means that all data buffered in the access point is already received. Accordingly, the wireless communication terminal initializes the timer using the voice CODEC packet generation cycle at step S330.

In case of voice CODEC using a silence suppression technology, a VoIP packet is not generated when a user does not speak. Therefore, an uplink VoIP packet may be not regularly generated due to the silence suppression technology. Here, the uplink VoIP packet is a frame corresponding to an access category setup as a trigger-enabled state where data is expected to be regularly transmitted after VoIP call setup. In this case, the uplink packet is not regularly transmitted. Accordingly, the access point may not be able to transmit buffered packet to the wireless communication terminal. In this case, delay of transmitting a downlink VoIP packet buffered in the access point becomes increased.

The steps S350 to S370 show operations of the wireless communication terminal when the terminal cannot regularly transmit an uplink packet to the access point due to the silence suppression scheme. Similar to when a VoIP packet is regularly transmitted, the wireless communication terminal initializes the timer at the step S330 and the wireless communication terminal determines whether a frame corresponding to an access category setup as a trigger-enabled state is transmitted or not at the step S340. At step S350, the wireless communication terminal determines whether the VoIP call is terminated or not if the frame corresponding to an access category setup as a trigger-enabled state is not transmitted based on the determination result of the step S340. If the VoIP call is terminated, the wireless communication terminal disables the timer at step S320 and sustains a call waiting state. Then, the wireless communication terminal continuously determines whether a VoIP call is set up or not until the VoIP call is setup in order to start a VoIP service in later.

At step S360, the wireless communication terminal compares a current timer value with a predetermined maximum timer value when it is determined that the VoIP call is not terminated at the step S350. If the predetermined maximum timer value is not exceeded, the wireless communication terminal determines whether the frame corresponding to the access category setup as a trigger-enabled state is transmitted or not at the step S340. Here, the maximum timer value is decided by the controller 120 in consideration of a maximum delay time of a VoIP packet allowed in a wireless link. The maximum timer value is a value transferred to the MAC processor 141.

If the current timer exceeds the predetermined maximum timer value, it means that a trigger-enabled frame is not transmitted to the uplink during a predetermined transmission cycle. Accordingly, the wireless communication terminal transmits a trigger frame such as a QoS Null frame of an access category setup as a trigger-enabled state at step S370. That is, the wireless communication terminal transmits a trigger frame performing the same function of the uplink VoIP in order to receive VoIP data buffered in the access point. By transmitting the trigger frame, the U-SP begins. If the access point includes buffered data, the access point transmits a frame with the buffered data to the wireless communication terminal. If the access point does not include buffered data, the access point transmits a QoS Null frame with an ESOP field setup to the wireless communication terminal. At step S380, the access point transmits a frame having data with a corresponding access category received from the wireless communication terminal when the access point includes the buffered data. If the access point does not include buffered data, the access point transmits a QoS Null frame with the ESOP field setup to the wireless communication terminal.

At step S390, the wireless communication terminal determines whether the ESOP field of the header is set to 1 or not while receiving data from the access point. If the EOSP field is not setup, the wireless communication terminal continuously receives the data from the access point at the step S380 because the U-SP is not end. If the EOSP field is setup, the wireless communication terminal initializes the timer with the voice CODEC packet generation cycle at the step S330.

As described above, the power saving method in accordance with an embodiment of the present invention uses a timer setup based on a voice CODEC packet generation cycle after VoIP call setup. Accordingly, the power saving method in accordance with an embodiment of the present invention has an advantageous of constantly sustaining a downlink VoIP packet transmission delay, which may be deteriorated by the silence suppression scheme in a related method transmitting data through an uplink without a timer.

Therefore, the power saving apparatus and method in accordance with an embodiment of the present invention can expands an operation time of a wireless communication terminal by reducing power consumption.

While the present invention has been described with respect to the specific embodiments, it will be apparent to those skilled in the art that various changes and modifications may be made without departing from the spirit and scope of the invention as defined in the following claims.

What is claimed is:

1. A power control apparatus of a terminal supporting a voice over internet protocol (VoIP) service in a wireless communication system, comprising:
a user interface unit configured to include a voice CODEC using in the VoIP service;
a controller configured to be connected to the user interface unit, include predetermined application programs including a VoIP application program, and control signaling for setting up a VoIP service call and canceling the VoIP service call; and
a medium access control (MAC) processor configured to perform a medium access control function and include a timer unit in order to transmit a trigger frame for beginning a unscheduled-service period (U-SP), by receiving a VoIP service call setup signal and a VoIP service call cancel signal from the controller,
wherein, when the VoIP service call is not set up, in a delivery-enabled state of four access categories, the MAC processor receives a beacon frame from an access point (AP), analyzes a traffic indication message included in the beacon frame, determines whether data are buffered or not in the AP, when the AP has the buffered data, transmits the trigger frame to the AP, and receives the buffered data from the AP receiving the trigger frame.

2. The power control apparatus of claim 1, wherein the MAC processor initializes the timer unit when the VoIP service call is set up, determines whether the VoIP service call is terminated or not when a frame of an access category being set up as a trigger-enabled state is not transmitted to the AP, transmits the trigger frame to the AP when it is determined that the VoIP service call is not terminated and when a value of the timer unit exceeds a predetermined timer maximum value, and receives the buffered data from the AP receiving the trigger frame.

3. The power control apparatus of claim 2, wherein the timer maximum value is decided based on a packet generation cycle of the voice CODEC.

4. The power control apparatus of claim 1, wherein the MAC processor receives the buffered data from the AP when a frame of an access category being set up as the delivery-enabled state is transmitted to the AP, and determines whether an End of Service Period (EOSP) field is set up or not when the buffered data is received from the AP, and initializes the timer unit when the ESOP field is set up.

5. A method for controlling power of a terminal supporting a voice over internet protocol (VoIP) service in a wireless communication system, comprising:
 when a VoIP service call is not set up, receiving a beacon frame from an access point (AP), analyzing a traffic indication message included in the beacon frame, and determining whether data are buffered or not in the AP;
 when the AP has the buffered data, transmitting a trigger frame to the AP;
 receiving the buffered data from the AP receiving the trigger frame;
 when the VoIP service call is setup for starting the VoIP service, initializing a timer unit;
 when a frame of an access category being set up as a trigger-enabled state is not transmitted to the AP, determining whether the VoIP service call is terminated or not;
 when it is determined that the VoIP service call is not terminated and when a value of the timer exceeds a predetermined timer maximum value, transmitting the trigger frame to the AP; and
 receiving the buffered data from the AP receiving the trigger frame.

6. The method of claim 5, further comprising when a frame of a access category being set up as the delivery-enabled state is transmitted to the AP, receiving the buffered data from the AP.

7. The method of claim 5, wherein the timer unit is interrupted when the Vol P service call is terminated.

8. The method of claim 5, wherein it is determined whether the frame of the access category being setup as the trigger enabled state is transmitted or not, when the value of the timer unit does not exceed the timer maximum value.

9. The method of claim 5, further comprising:
 determining whether an End of Service Period (EOSP) field is set up or not when the buffered data is received from the AP; and
 initializing the timer unit when the ESOP field is set up.

10. The method of claim 9, wherein the buffered data is continuously received from the AP when the EOSP field is not set up.

11. The method of claim 5, the timer maximum value is decided based on a packet generation cycle of a voice CODEC.

12. A method for controlling power of a terminal supporting a voice over internet protocol (VoIP) service in a wireless communication system, comprising:
 when a Vol P service call is not set up, receiving a beacon frame from an access point (AP), analyzing a traffic indication message included in the beacon frame, and determining whether data are buffered or not in the AP;
 when the AP has the buffered data, transmitting a trigger frame to the AP; and
 receiving the buffered data from the AP receiving the trigger frame,
 wherein the method further comprises:
 determining whether an End of Service Period (EOSP) field is set up or not when the buffered data is received from the AP;
 terminating receipt of the buffered data when the ESOP field is set up; and
 waiting receipt of a next beacon frame.

13. The method of claim 12, wherein the buffered data is continuously received from the AP when the EOSP field is not set up.

14. The method of claim 12, further comprising waiting receipt of a next beacon frame when the AP does not have the buffered data.

* * * * *